United States Patent
Lee

(10) Patent No.: US 7,228,157 B2
(45) Date of Patent: Jun. 5, 2007

(54) DISPLAY WINDOW OF A MOBILE PHONE

(75) Inventor: Young-Jin Lee, Taegukwangyok-shi (KR)

(73) Assignees: Samsung Electronics Co., Ltd. (KR); Taeyang Electronics Co., Ltd. (KR)

(*) Notice: Subject to any disclaimer, the term of this patent is extended or adjusted under 35 U.S.C. 154(b) by 607 days.

(21) Appl. No.: 10/226,041

(22) Filed: Aug. 21, 2002

(65) Prior Publication Data

US 2003/0040287 A1   Feb. 27, 2003

(30) Foreign Application Priority Data

Aug. 21, 2001   (KR) ............................... 2001-25284

(51) Int. Cl.
*G02F 1/13*   (2006.01)
*H04B 1/38*   (2006.01)
*H04M 1/00*   (2006.01)

(52) U.S. Cl. ............... 455/566; 455/575.8; 455/550.1; 455/575.1; 349/1; 349/16; 428/33; 428/34

(58) Field of Classification Search ............... 455/566, 455/575.8, 550.1, 575.1; 349/1, 16; 428/33, 428/34
See application file for complete search history.

(56) References Cited

U.S. PATENT DOCUMENTS

| | | | |
|---|---|---|---|
| 4,046,951 A * | 9/1977 | Stefanik | 428/412 |
| 5,637,363 A * | 6/1997 | Leray et al. | 428/34 |
| 5,897,727 A * | 4/1999 | Staral et al. | 156/99 |
| 6,294,233 B1 * | 9/2001 | Barth et al. | 428/34 |
| 6,630,228 B1 * | 10/2003 | Jarnebrink et al. | 156/278 |
| 6,926,786 B2 * | 8/2005 | Frost et al. | 156/101 |
| 2001/0038493 A1 * | 11/2001 | Watanabe et al. | 359/609 |

* cited by examiner

*Primary Examiner*—Lana Le
*Assistant Examiner*—Wen Huang
(74) *Attorney, Agent, or Firm*—The Farrell Law Firm

(57) ABSTRACT

A display window of a mobile phone, which prevents a deposited layer from being exposed and being oxidized/corroded, thereby improving not only the quality of the display window but also the reliability on the mobile phone provided with the display window. The display window has a deposited layer and a printed layer, which are formed in sequence on a transparent sheet, and a protective layer coated on outer edges of the deposited layer and printed layers, thereby preventing the deposited layer from being exposed.

2 Claims, 5 Drawing Sheets

DISPLAY WINDOW OF A MOBILE PHONE

PRIORITY

This application claims priority to a Korean Utility Model application entitled "Display Window Of A Mobile Phone" filed in the Korean Industrial Property Office on Aug. 21, 2001 and assigned Serial No. 2001-25284, the contents of which are hereby incorporated by reference.

BACKGROUND OF THE INVENTION

1. Field of the Invention

The present invention relates to a display window of a mobile phone, and more particularly to an improved construction of a display window, which is provided at a mobile phone so as to protect a liquid crystal screen of the mobile phone, on which various information is displayed.

2. Description of the Related Art

Mobile phones have various shapes and functions for providing convenience for users of the mobile phones. In a conventional mobile phone, a liquid crystal screen displaying general information about the mobile phone for users is disposed at a central portion of the mobile phone. The liquid crystal screen displays various information required in using the mobile phone, such as the phone number and transmission/reception state. Especially, in recent times, the mobile phone is often and widely utilized in transmitting E-mails, character messages, etc., so that the dimension of the liquid crystal screen has a tendency to be increased.

One problem is that the liquid crystal screen is fragile and can be easily broken by an external impact. Therefore, in order to protect the liquid crystal screen, a display window 1 made from synthetic resin is assembled outside of the liquid crystal screen as illustrated in FIG. 1.

As illustrated in FIGS. 2 and 3, in manufacturing the display window 1 for protecting the liquid crystal screen of a mobile phone 100, a deposited layer 11 is first formed on a flat transparent sheet 10 made from synthetic resin though a deposition step, in which nonferrous metal powder such as powder of Al, Ni, Cu, or Ti is deposited and coated on the flat transparent sheet. Thereafter, a printed layer 12 having various rim shapes such as a rectangular-rimmed shape is formed on the deposited layer 11.

After the printed layer 12 is formed, an etching is performed by utilizing predetermined chemicals, to eliminate predetermined portions of the deposited layer 11, thereby changing opaque portions of the display window 1 covered by the deposited layer 11 into transparent portions, through which the liquid crystal screen can be viewed.

After an etched sheet 13 is manufactured by the etching, various characters required by manufacturers of mobile phones, such as symbols and logos of the manufacturers, are printed on the printed layer 12, and the etched sheet 13 is cut along the shape of the remaining deposited layer 11, so that complete display windows 1 for mobile phones are manufactured.

However, as illustrated in FIG. 2, side edges of the printed layer 12 and the deposited layer 11 of the display window 1 are exposed, so that the deposited layer 11 made from nonferrous metal powder may be oxidized/corroded, thereby having bad influence on the external appearance of the entire display window. The oxidization/corrosion of the deposited layer 11 of the display window 1 deteriorates not only the external appearance of the display window 1 itself but also the quality of the mobile phone 100 provided with the display window 1, thereby reducing its reliability for customers.

SUMMARY OF THE INVENTION

Accordingly, the present invention has been designed to solve the above-mentioned problems occurring in the prior art, and an object of the present invention is to provide a display window of a mobile phone, in which a protective layer is formed along an edge of the display window, so as to prevent a deposited layer from being exposed and being oxidized/corroded, thereby improving not only the quality of the display window but also the reliability on the mobile phone provided with the display window.

In order to accomplish this object, there is provided a display window for protecting a liquid crystal screen of a mobile phone, the display window comprising: a transparent sheet made from synthetic resin and having a predetermined thickness and area; a deposited layer formed on the transparent sheet; a printed layer formed on the deposited layer and having a shape of a closed loop with a regular width, the printed layer having an outer edge disposed a predetermined space inside from an outer edge of the transparent sheet; and a protective layer formed in the predetermined space between the outer edge of the transparent sheet and the outer edge of the deposited layer, the protective layer being transparent or colored. The deposited layer is formed by etching after depositing nonferrous metal powder on an entire surface of the transparent sheet, so that the deposited layer remains only between the printed layer and the transparent sheet, and the protective layer is coated on outer edges of the deposited layer and printed layers, thereby preventing the deposited layer from being exposed.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENT

A preferred embodiment of the present invention will be described herein below with reference to the accompanying drawings. In the following description of the present invention, a detailed description of known functions and configurations incorporated herein will be omitted when it may make the subject matter of the present invention confusing.

Figure 1:
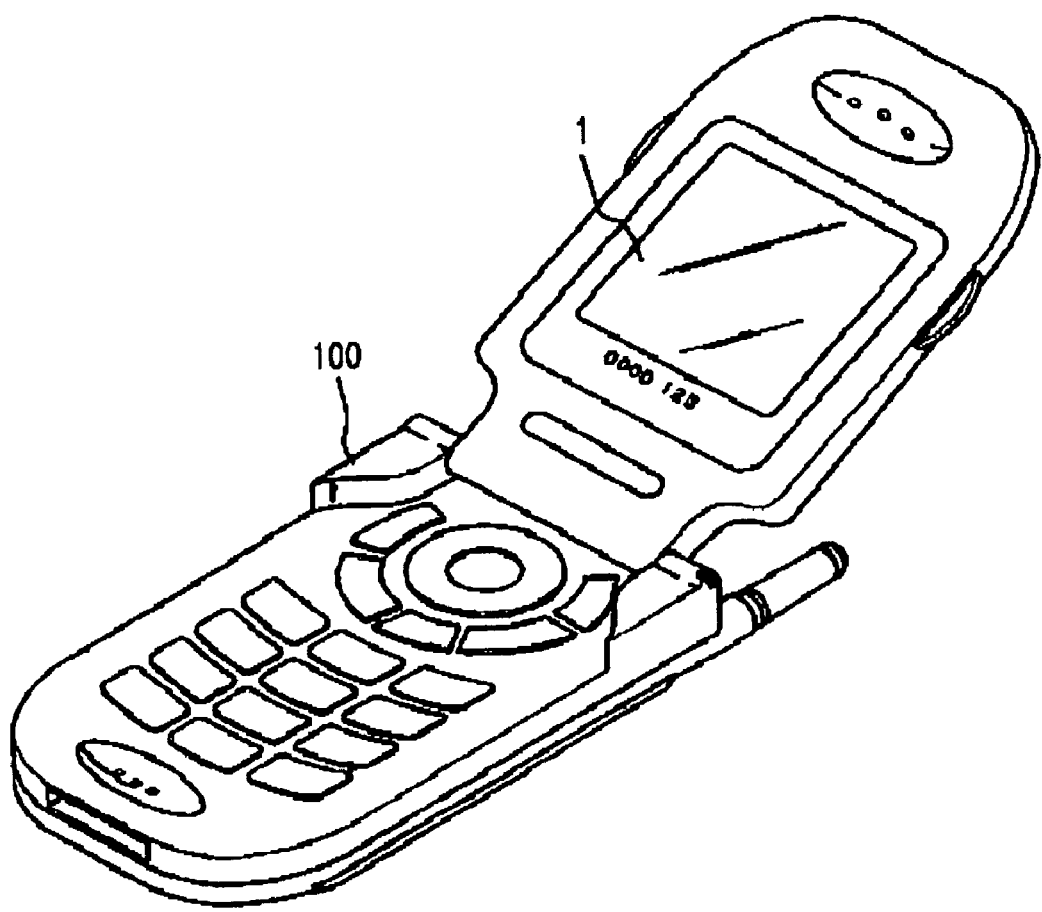
FIG. 1 is a perspective view of a conventional mobile phone.
Figure 2:
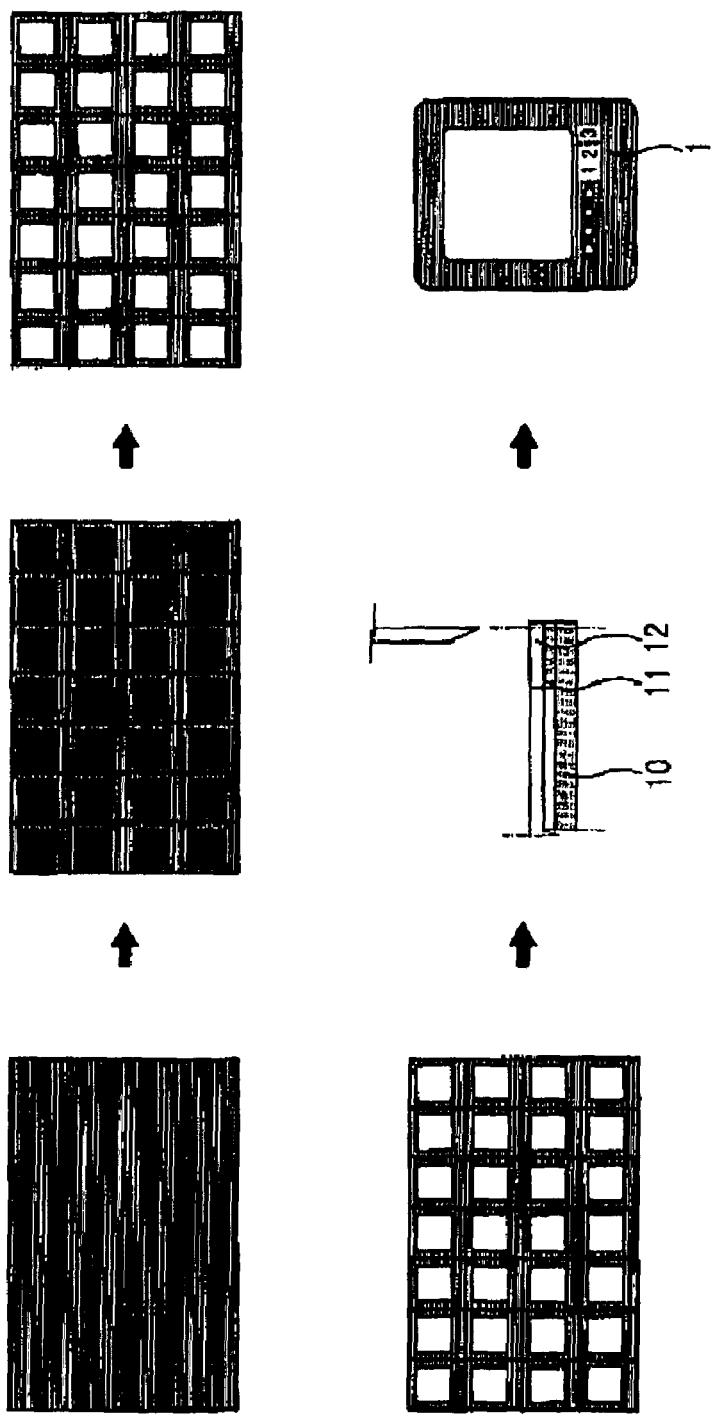
FIG. 2 is a view illustrated a process of manufacturing a conventional display window of a mobile phone.
Figure 3:
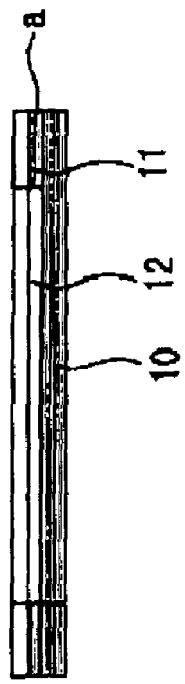
FIG. 3 is a plan and a side view of a conventional display window of a mobile phone.
Figure 3:
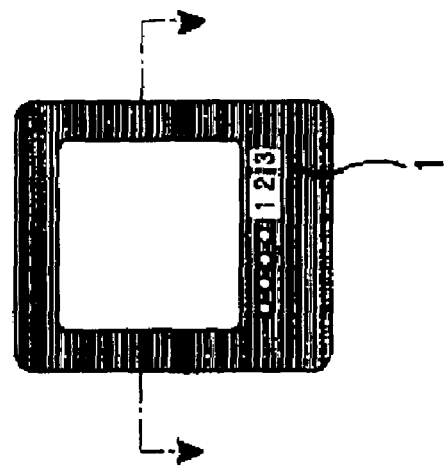
Figure 4:
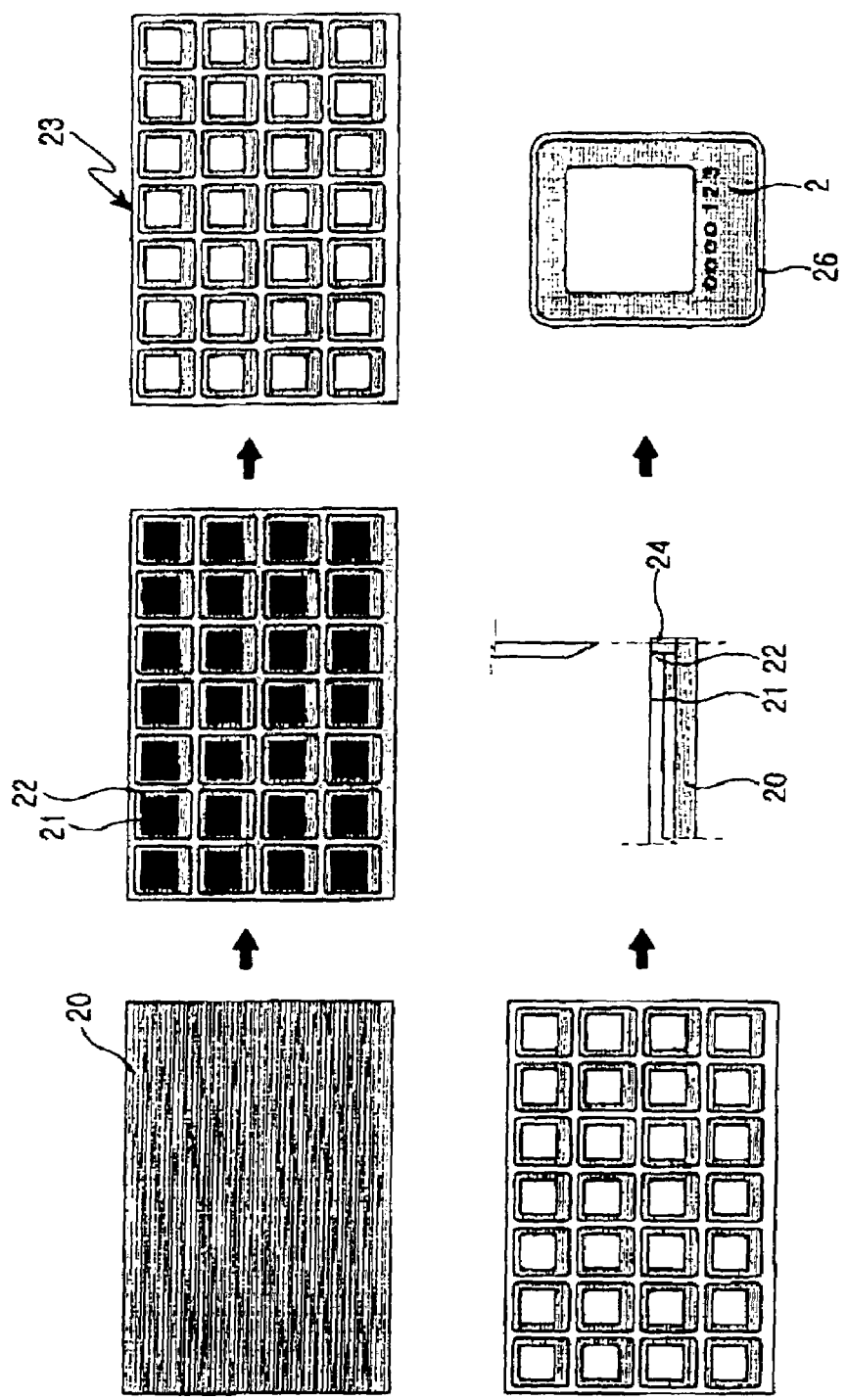
FIG. 4 is a view illustrated a process of manufacturing a display window of a mobile phone according to a preferred embodiment of the present invention.
Figure 5:
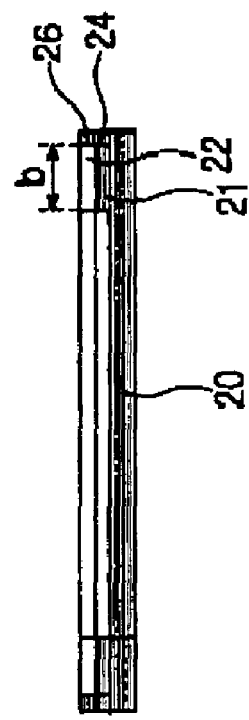
FIG. 5 is a plan and side view of a display window of a mobile phone according to a preferred embodiment of the present invention.
Figure 5:
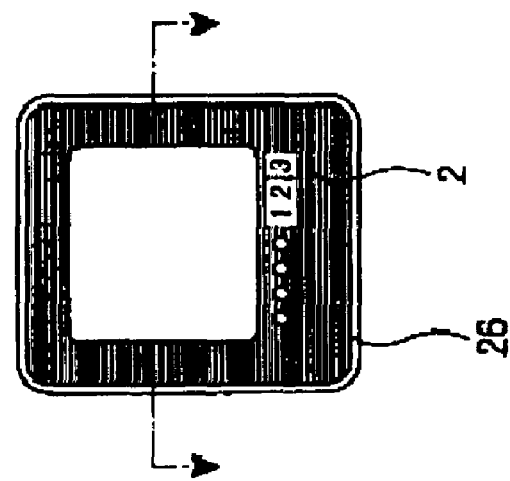

As illustrated in FIGS. 4 and 5, a display window of a mobile phone according to the present invention includes a central portion, a transparent portion formed at peripheral portions of the window, and an opaque section in which a deposited layer and a printed layer overlap each other. In FIG. 4, a display window 2 of a mobile phone according to the present invention includes a transparent sheet 20 having a predetermined thickness and area made from synthetic resin, and a deposited layer 21 deposited on the entire surface of the transparent sheet 20. The deposited layer 21 has a uniform thickness and is formed by depositing non-ferrous metal powder on the transparent sheet 20.

Further, a printed layer 22 is formed on the deposited layer 21 in such a manner that the printed layer 22 has a predetermined width b so as to form the external appearance of the display window 2 corresponding to the liquid crystal screen of the mobile phone. In this case, the outer edge of the printed layer 22 is not equal to that of the conventional display window, but is disposed a predetermined distance inside from the outer edge of the display window 2 when the display window 2 is completed, as illustrated in FIG. 5.

After the above-mentioned printed layer 22 having various rim shapes, such as a rectangular-rimmed shape, is formed on the deposited layer 21, the transparent sheet 20 is subjected to an etching by means of predetermined chemicals, so as to eliminate predetermined portions of the deposited layer 21, thereby changing opaque portions of the surface of the transparent sheet 20 covered by the deposited layer 21 into transparent portions, through which the liquid crystal screen can be viewed.

After an etched sheet 23 is manufactured by the etching, various characters required by manufacturers of mobile phones, such as symbols and logos of the manufacturers, are printed on the printed layer 22.

Thereafter, a transparent film or film with one of various colors is coated on an etched portion 24, which means exposed outer edges of the deposited layer 21 and the printed layer 22. Then, the transparent sheet 20 is cut not along the outer edge of the printed layer 22 but along a portion including the coated film outside of the outer edge of the printed layer 22, so that the coated film forms a protective layer 26 having a predetermined width along the rim of the display window 2 as illustrated in FIG. 5.

In the display window 2 manufactured through the above process, the deposited layer 21 is not exposed but is covered by the protective layer 26, that is, the coated film. Therefore, the protective layer 26 prevents the deposited layer 21 from being oxidized/corroded, differently from the conventional display window, in which the deposited layer 11 and the printed layer 12 are exposed and the deposited layer 11 is oxidized/corroded.

In forming the protective layer 26 which prevents the deposited layer 21 from being oxidized/corroded, the printed layer 22 has a smaller width in comparison with that of the prior art, while the entire width of the transparent section is maintained the same, and the protective layer 26 is formed in the gap formed due to the difference of the width, so that there is no change in the entire dimension of the display window.

As described above, in a display window of a mobile phone according to the present invention, a protective layer formed along the edge of the display window prevents the deposited layer from being exposed and being oxidized/corroded, thereby improving not only the quality of the display window but also the reliability of the mobile phone provided with the display window.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A display window for protecting a liquid crystal screen of a mobile phone, the display window comprising:
   a transparent sheet having a predetermined thickness and area;
   a deposited layer formed on the transparent sheet;
   a printed layer formed on the deposited layer and having a shape of a closed loop with a regular width, the printed layer having an outer edge disposed a predetermined space inside from an outer edge of the transparent sheet; and
   a protective layer having a thickness which is substantially equal to a thickness of the deposited layer and printed layer at a location which corresponds with the outer edge of the transparent sheet such that the protective layer fully occupies the predetermined space between the outer edge of the transparent sheet and the outer edge of the deposited layer, the protective layer being transparent or colored;
   wherein the deposited layer is formed by etching after depositing nonferrous metal powder on an entire surface of the transparent sheet, so that the deposited layer remains only between the printed layer and the transparent sheet, and the protective layer is coated on outer edges of the deposited layer and printed layers, thereby preventing the deposited layer from being exposed.

2. The display window of claim 1, wherein the transparent sheet is made from a synthetic resin.

* * * * *